US011907835B2

United States Patent
Irani et al.

(10) Patent No.: US 11,907,835 B2
(45) Date of Patent: Feb. 20, 2024

(54) SIGNAL ENHANCEMENT AND MANIPULATION USING A SIGNAL-SPECIFIC DEEP NETWORK

(71) Applicant: YEDA RESEARCH AND DEVELOPMENT CO. LTD., Rehovot (IL)

(72) Inventors: Michal Irani, Rehovot (IL); Assaf Shocher, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 163 days.

(21) Appl. No.: 16/765,886

(22) PCT Filed: Nov. 26, 2018

(86) PCT No.: PCT/IL2018/051281
§ 371 (c)(1),
(2) Date: May 21, 2020

(87) PCT Pub. No.: WO2019/102476
PCT Pub. Date: May 31, 2019

(65) Prior Publication Data
US 2020/0364556 A1    Nov. 19, 2020

Related U.S. Application Data

(60) Provisional application No. 62/590,589, filed on Nov. 26, 2017.

(51) Int. Cl.
*G06N 3/08* (2023.01)
*G06T 3/40* (2006.01)
*G06T 5/00* (2006.01)

(52) U.S. Cl.
CPC ............. *G06N 3/08* (2013.01); *G06T 3/4053* (2013.01); *G06T 5/001* (2013.01);
(Continued)

(58) Field of Classification Search
None
See application file for complete search history.

(56) References Cited

U.S. PATENT DOCUMENTS 6,269,351 B1 * 7/2001 Black .................... G06F 16/30
706/15
8,234,228 B2    7/2012 Weston et al.
(Continued)

FOREIGN PATENT DOCUMENTS

WO    WO 2014/205231 A1    12/2014
WO    WO 2016/019484 A1    2/2016
WO    WO 2016/132145 A1    8/2016

OTHER PUBLICATIONS

J. Chen, X. He, H. Chen, Q. Teng and L. Qing, "Single image super-resolution based on deep learning and gradient transformation," 2016 IEEE 13th International Conference on Signal Processing (ICSP), 2016, pp. 663-667, doi: 10.1109/ICSP.2016.7877915.*
(Continued)

*Primary Examiner* — Jiangeng Sun
(74) *Attorney, Agent, or Firm* — Mark S. Cohen; PEARL COHEN ZEDEK LATZER BARATZ LLP

(57) ABSTRACT

Given an input image, an image enhancement task, and no external examples available to train on, an Image-Specific Deep Network is constructed tailored to solve the task for this specific image. Since there are no external examples available to train on, the network is trained on examples extracted directly from the input image itself. The current (Continued)

solution solves the problem of Super-Resolution (SR), whereas the framework is more general and is not restricted to SR.

18 Claims, 9 Drawing Sheets

(52) U.S. Cl.
CPC ............... *G06T 2207/20016* (2013.01); *G06T 2207/20081* (2013.01); *G06T 2207/20084* (2013.01); *G06T 2207/20132* (2013.01)

(56) References Cited

U.S. PATENT DOCUMENTS

| | | |
|---|---|---|
| 8,306,121 B2 | 11/2012 | Jia |
| 9,104,186 B2 | 8/2015 | Sinyavskiy et al. |
| 9,668,699 B2 | 6/2017 | Georgescu et al. |
| 2006/0251330 A1* | 11/2006 | Toth .................. H04N 19/96 382/236 |
| 2014/0336539 A1* | 11/2014 | Torres ................ A61B 5/7264 600/595 |
| 2015/0342560 A1* | 12/2015 | Davey ................ A61B 8/5215 600/443 |
| 2015/0347819 A1 | 12/2015 | Yin et al. |
| 2017/0287109 A1 | 10/2017 | Tasfi |

OTHER PUBLICATIONS

Kaibing Zhang, Dacheng Tao, Xinbo Gao, Xuelong Li, and Zenggang Xiong, "Learning multiple linear mappings for efficient single image super-resolution", IEEE Trans. on Image Processing, vol. 24, No. 3, Mar. 2015.*
Christian Ledig et. al. "Photo-Realistic Single Image Super-Resolution Using a Generative Adversarial Network", arXiv: 1609. 04802v5 [cs.CV] May 25, 2017.*
N. Kumar and A. Sethi, "Fast Learning-Based Single Image Super-Resolution," in IEEE Transactions on Multimedia, vol. 18, No. 8, pp. 1504-1515, Aug. 2016, doi: 10.1109/TMM.2016.2571625.*
Mandan Zhao, Chuanqi Cheng, Zhenjie Zhang and Xiangyang Hao, "Deep convolutional networks super-resolution method for reconstructing high frequency information of the single image," 2017 2nd International Conference on Image, Vision and Computing (ICIVC), 2017, pp. 531-535, doi: 10.1109/ICIVC.2017.7984.*
Chao Dong, Chen Change Loy, "Image Super-Resolution Using Deep Convolutional Networks", arXiv:1501.00092v3 [cs.CV] Jul. 31, 2015.*
Y. Fan et al., "Balanced Two-Stage Residual Networks for Image Super-Resolution," 2017 IEEE Conference on Computer Vision and Pattern Recognition Workshops (CVPRW), 2017, pp. 1157-1164, doi: 10.1109/CVPRW.2017.154.*
Radu Timofte, Rasmus Rothe, Luc Van Gool, "Seven ways to improve example-based single image super resolution", arXiv:1511. 02228v1 [cs.CV] Nov. 6, 2015.*
Glasner, Daniel & Bagon, Shai & Irani, Michal. (2009). Super-Resolution from a Single Image. Proceedings of the IEEE International Conference on Computer Vision. 349-356. 10.1109/ICCV. 2009.5459271. (Year: 2009).*
Bahat et al. "Non-uniform blind deblurring by reblurring" In Proceedings of the IEEE International Conference on Computer Vision 2017 (pp. 3286-3294).
Bahat et al. "Blind dehazing using internal patch recurrence" In 2016 IEEE International Conference on Computational Photography (ICCP) May 13, 2016 (pp. 1-9). IEEE.
Dong et al. "Learning a deep convolutional network for image super-resolution" In European conference on computer vision Sep. 6, 2014 (pp. 184-199). Springer, Cham.

Efrat et al. "Accurate blur models vs. image priors in single image super-resolution" In Proceedings of the IEEE International Conference on Computer Vision 2013 (pp. 2832-2839).
Freedman et al. "Image and video upscaling from local self-examples" ACM Transactions on Graphics (TOG). Apr. 22, 2011:30(2):1-1.
Glasner et al. "Super-resolution from a single image" in 2009 IEEE 12th international conference on computer vision Sep. 29, 2009 (pp. 349-356). IEEE.
Huang et al. "Single image super-resolution from transformed self-exemplars" In Proceedings of the IEEE conference on computer vision and pattern recognition 2015 (pp. 5197-5206).
International Search Report for PCT Application No. PCT/IL2018/ 051281 dated May 15, 2019.
Irani et al. "Improving resolution by image registration" CVGIP: Graphical models and image processing. May 1, 1991;53(3):231-9.
Kim et al. "Accurate image super-resolution using very deep convolutional networks" In Proceedings of the IEEE conference on computer vision and pattern recognition 2016 (pp. 1646-1654).
Kim et al. "Deeply-recursive convolutional network for image super-resolution" In Proceedings of the IEEE conference on computer vision and pattern recognition 2016 (pp. 1637-1645).
Kingma et al. "A method for stochastic optimization" arXiv preprint arXiv:1412.6980. Dec. 22, 2014.
Ledig et al. "Photo-realistic single image super-resolution using a generative adversarial network" In Proceedings of the IEEE conference on computer vision and pattern recognition 2017 (pp. 4681-4690).
Lim et al. "Enhanced deep residual networks for single image super-resolution" In Proceedings of the IEEE conference on computer vision and pattern recognition workshops 2017 (pp. 136-144).
Martin et al. "A database of human segmented natural images and its application to evaluating segmentation algorithms and measuring ecological statistics" In Proceedings Eighth IEEE International Conference on Computer Vision. ICCV 2001 Jul. 7, 2001 (vol. 2, pp. 416-423). IEEE.
Michaeli et al. "Nonparametric blind super-resolution" In Proceedings of the IEEE International Conference on Computer Vision 2013 (pp. 945-952).
Michaeli et al. "Blind deblurring using internal patch recurrence" In European Conference on Computer Vision Sep. 6, 2014 (pp. 783-798). Springer, Cham.
Mosseri et al. "Combining the power of internal and external denoising" In IEEE international conference on computational photography (ICCP) Apr. 19, 2013 (pp. 1-9). IEEE.
Oktay et al. "Multi-input cardiac image super-resolution using convolutional neural networks" In International conference on medical image computing and computer-assisted intervention Oct. 17, 2016 (pp. 246-254). Springer, Cham.
Santoro et al. "Meta-learning with memory-augmented neural networks" In International conference on machine learning Jun. 11, 2016 (pp. 1842-1850).
Timofte et al. "A+: Adjusted anchored neighborhood regression for fast super-resolution" In Asian conference on computer vision Nov. 1, 2014 (pp. 111-126). Springer, Cham.
Timofte et al. "Seven ways to improve example-based single image super resolution" In Proceedings of the IEEE Conference on Computer Vision and Pattern Recognition 2016 (pp. 1865-1873).
Timofte et al. "Ntire 2017 challenge on single image super-resolution: Methods and results" In Proceedings of the IEEE conference on computer vision and pattern recognition workshops 2017 (pp. 114-125).
Ulyanov et al. "Deep image prior" In Proceedings of the IEEE Conference on Computer Vision and Pattern Recognition 2018 (pp. 9446-9454).
Xian et al. "Zero-shot learning—the good, the bad and the ugly" In Proceedings of the IEEE Conference on Computer Vision and Pattern Recognition 2017 (pp. 4582-4591).
Zontak et al. "Internal statistics of a single natural image" In CVPR 2011 Jun. 20, 2011 (pp. 977-984). IEEE.
Zontak et al. "Separating signal from noise using patch recurrence across scales" In Proceedings of the IEEE Conference on Computer Vision and Pattern Recognition 2013 (pp. 1195-1202).

(56) References Cited

OTHER PUBLICATIONS

Dong et al. "Image super-resolution using deep convolutional networks" IEEE transactions on pattern analysis and machine intelligence. Jun. 1, 2015;38(2):295-307.
Johnson et al. "Perceptual losses for real-time style transfer and super-resolution" In European conference on computer vision Oct. 8, 2016 (pp. 694-711). Springer, Cham.
Supplementary European Search Report for European Application No. 18880362.1 dated Jul. 21, 2021.
Tuzel et al. "Global-local face upsampling network" arXiv preprint arXiv:1603.07235. Mar. 23, 2016.

\* cited by examiner

Fig. 1A Historic image: Check-point Charlie (end of World-War II) - *SR x 2*
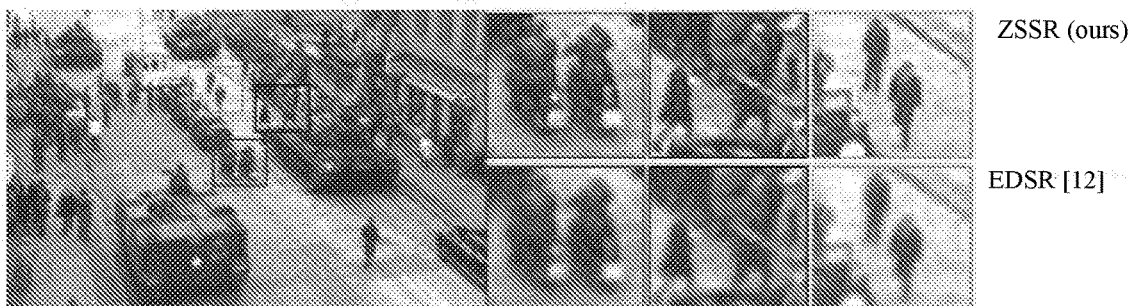
ZSSR (ours)
EDSR [12]
Fig. 1B iPhone image - *SR x 3*     Fig. 1C Historic image: JFK funeral - *SR x 2*
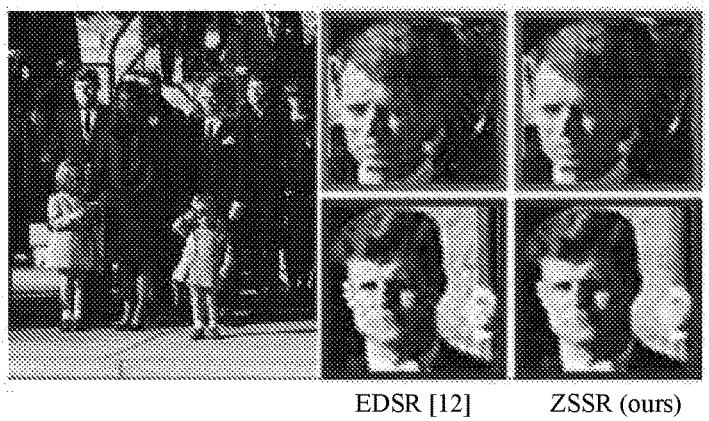
EDSR [12]     ZSSR (ours)
Fig. 1D image downloaded from the Internet - *SR x 2*
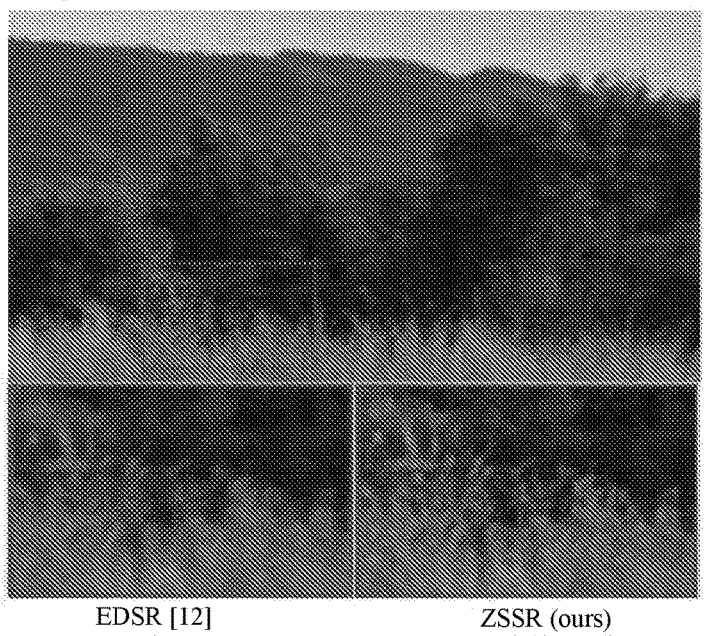
EDSR [12]     ZSSR (ours)          EDSR [12]          ZSSR (ours)

SR under aliasing:
Fig. 2A
Fig. 2B
Ground truth
(PSNR /SSIM)
Fig. 2C
EDSR+ [12]
(21.64/ 0.6641)
Fig. 2D
ZSSR (ours)
(25.02/ 0.7658)
SR under unknown non-ideal downscaling kernel:
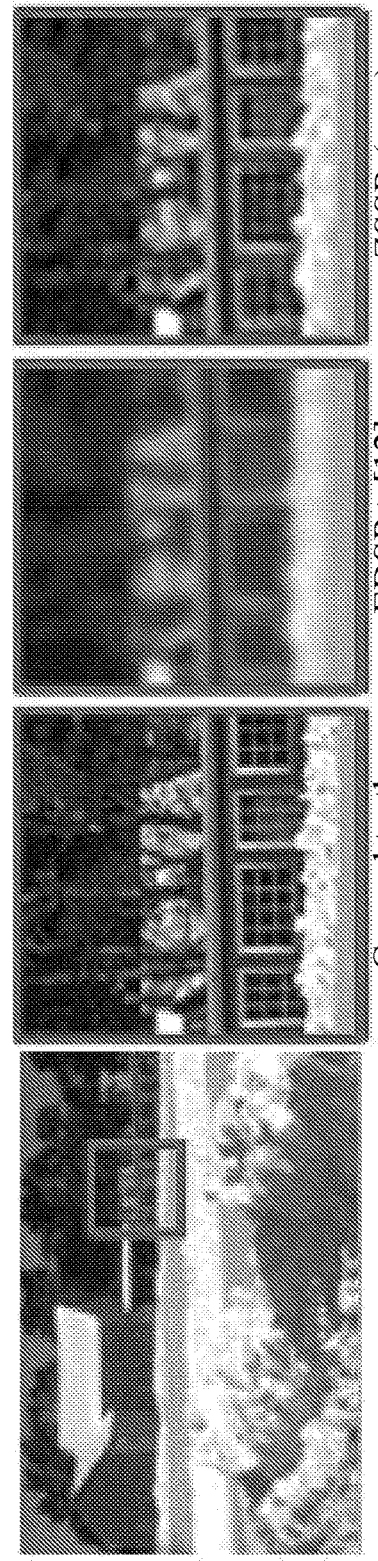
Fig. 2E
Fig. 2F
Ground truth
(PSNR /SSIM)
Fig. 2G
EDSR+ [12]
(24.44/ 0.7006)
Fig. 2H
ZSSR (ours)
(27.62/ 0.8367)

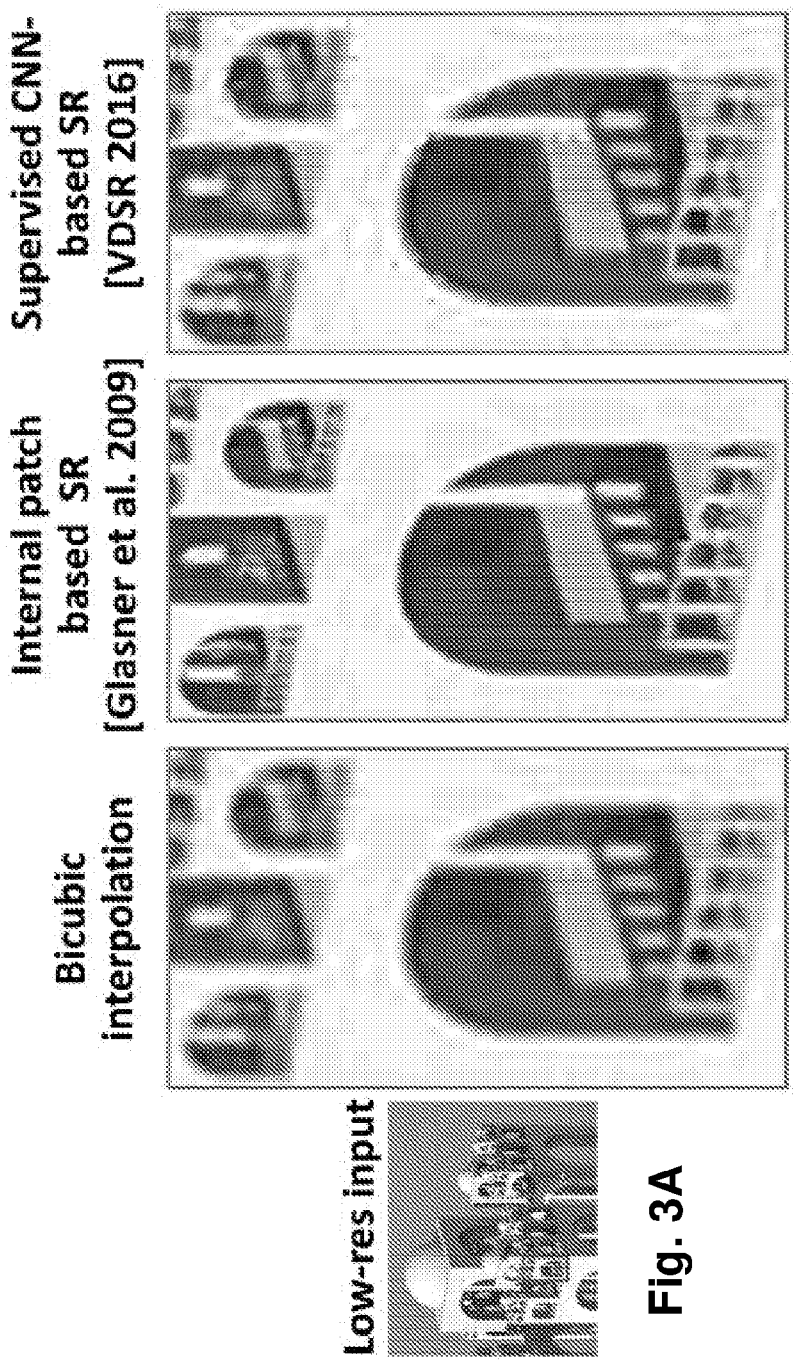

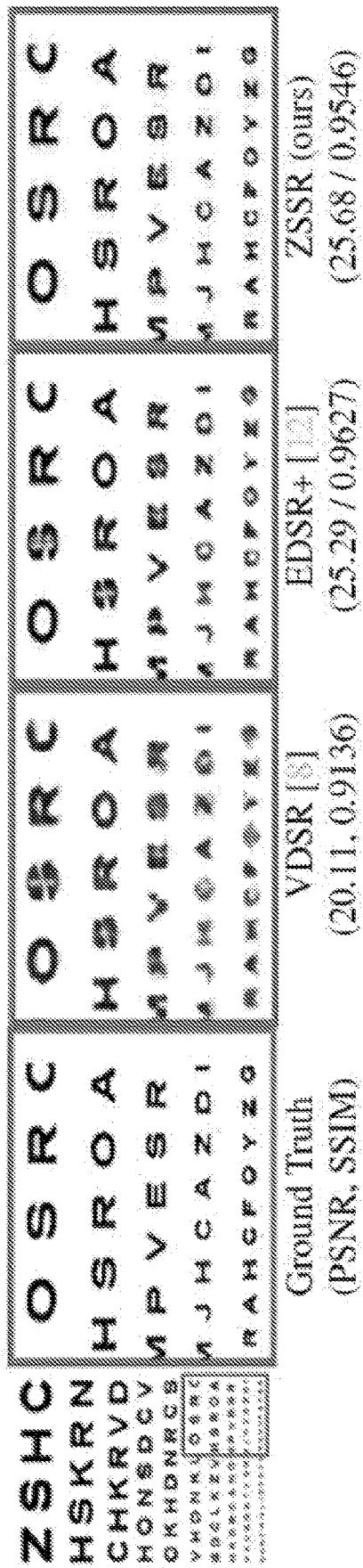

SIGNAL ENHANCEMENT AND MANIPULATION USING A SIGNAL-SPECIFIC DEEP NETWORK

CROSS-REFERENCE TO RELATED APPLICATIONS

This application is a National Phase Application of PCT International Application No. PCT/IL2018/051281, International Filing Date Nov. 26, 2018, claiming priority of US Provisional Patent Applications No(s). 62/590,589, filed Nov. 26, 2017, which is hereby incorporated by reference.

BACKGROUND OF THE INVENTION

Deep Learning has led to a dramatic leap in Super-Resolution (SR) performance in the past few years. However, being supervised, these SR methods are restricted to specific training data, where the acquisition of the low-resolution (LR) images from their high-resolution (HR) counterparts is predetermined (e.g., bicubic downscaling), without any distracting artifacts (e.g., sensor noise, image compression, non-ideal PSF, etc.). Real LR images, however, rarely obey these restrictions, resulting in poor SR results by State of the Art (SotA) methods.

Super-Resolution (SR) from a single image has recently received a huge boost in performance using Deep-Learning based methods. The recent SotA method [B. Lim, S. Son, H. Kim, S. Nah, and K. M. Lee. *Enhanced deep residual networks for single image super-resolution*. In *The IEEE Conference on Computer Vision and Pattern Recognition (CVPR)* Workshops, July 2017—"Lim et al."] exceeds previous non-Deep SR methods (supervised [Timofte, V. D. Smet, and L. V. Gool. *A+: Adjusted anchored neighborhood regression for fast super-resolution*. In *ACCV*, 2014—"Timofte et al."] or unsupervised [S. B. D. Glasner and M. Irani. *Super-resolution from a single image*. In *International Conference on Computer Vision (ICCV)*, 2009—"Glasner et al."; G. Freedman and R. Fattal. *Image and video upscaling from local self-examples*. *ACM Transactions on Graphics*, 30(2):12, 2011—"Freedman et al."; J. B. Huang, A. Singh, and N. Ahuja. *Single image super-resolution from transformed self-exemplars*. In *Proceedings of the IEEE Conference on Computer Vision and Pattern Recognition*, pages 5197-5206, 2015—"Huang et al."]) by few dBs. This boost in performance was obtained with very deep and well engineered convolutional neural networks (CNNs), which were trained exhaustively on external databases, for lengthy periods of time (days or weeks). However, while these externally supervised methods perform extremely well on data satisfying the conditions they were trained on, their performance deteriorates significantly once these conditions are not satisfied.

For example, SR CNNs are typically trained on high-quality natural images, from which the low-resolution (LR) images were generated with a specific predefined down-scaling kernel (usually a Bicubic kernel with antialiasing-MATLAB's default immersive command), without any distracting artifacts (sensor noise, non-ideal PSF, image compression, etc.), and for a predefined SR scaling-factor (usually ×2, ×3, or ×4; assumed equal in both dimensions). FIGS. 2C and 2G at the EDSR sections show what happens when these conditions are not satisfied, e.g., when the LR image is generated with a non-ideal (non-bicubic) down-scaling kernel, or contains aliasing effects, or simply contains sensor noise or compression artifacts. FIGS. 1A-1D at the EDSR recovering sections further show that these are not contrived cases, but rather occur often when dealing with real LR images-images downloaded from the internet, images taken by an iPhone, old historic images, etc. In those 'non-ideal' cases, SotA SR methods often produce poor results.

Ulyanov et al. [https://dmitryulyanov.github.io/deep_image_prior] disclose a randomly-initialized neural network that can be used as a prior with results for several inverse problems. The input to the presented network is random noise, and the target of the network is the degraded input image. In the suggested scheme, the network weights serve as a prior for the restored image. No testing or applying stage is disclosed.

SUMMARY OF THE INVENTION

According to some embodiments of the invention, a new computer implemented method is provided for performing a task on an input signal, the method comprising:
  constructing a signal-task deep learning neural network (DLNN), configured specifically for the task;
  training the DLNN using a training set, comprising pairs of training targets and their corresponding training inputs, extracted and/or generated from the input signal; and
  applying the trained DLNN on the input signal, wherein the input signal is provided as an input to the trained DLNN, to obtain an output signal in accordance with the task.

According to some embodiments, the training set is extracted and/or generated solely from the input signal.

According to some embodiments, the DLNN configuration is constructed by means of number of nodes, number of layers, and their inter connections. According to some embodiments, the network architecture is determined by the selected task (super-resolution, denoising, etc.) and wherein the weights in the network are specific to the input signal (learned by training on the examples extracted from the input signal).

According to some embodiments, the training-targets and the training-inputs, are extracted from at least one of: different parts of the input signal, different dimensions of the input signal.

According to some embodiments, the method further comprising providing the training set by:
  generating the training-targets from the input signal; and
  generating the corresponding training-input for each of the training-targets, by degrading the training-targets in accordance with the task.

According to some embodiments, the generating of the training-targets is obtained by transforming the input signal by at least one of the following transformations:
  rotating the input signal to at least one angle, around at least one axis;
  mirror reflecting the input signal, around at least one axis;
  scaling the input signal along at least one axis;
  cropping part of the input signal;
  applying an intensity transformation on the input signal;
  applying a filter on the input signal;
  applying a linear transformation on the input signal;
  applying a non-linear transformation on the input signal;
  applying the identity transformation on the input signal; and
  any combination thereof.

According to some embodiments, the input signal is at least one selected from the group consisting of: image, video sequence, medical signal, MRI, fMRI, audio, an N-dimensional signal (N is an integer number>0).

According to some embodiments, the task is at least one selected from the group consisting: super-resolution, deblurring, denoising, completion of missing data, distortion correction, correcting compression artifacts, dehazing (haze removal), signal-enhancement, signal-manipulation, degradation removal.

According to some embodiments, the training is further performed using an external training set, provided by other signals.

According to some embodiments, the method further comprising using the trained DLNN to estimate a degradation underlying the input signal. According to some embodiments, the estimated degradation is at least one of: a blur kernel, a non-uniform blur-field, a super-resolution downscaling kernel, a noise type, a compression type.

According to some embodiments, the step of training the DLNN comprises a step of decreasing the learning rate of the DLNN, wherein the learning rate is computed using the ratio between the slope of the last N training errors and the deviations of the last N training errors with respect to the slope (N is an integer number>0).

According to some embodiments, the method is implemented via at least one device selected from a group consisting of: a computer, a camera, a mobile phone, a screen, a photo editing software, a projector, a computer chip, a hardware platform.

It is another object of the present invention to provide a new transient or non-transient new computer readable medium (CRM) that, when loaded into a memory of a computing device and executed by at least one processor of the computing device, configured to execute the steps of a computer implemented method for performing a task on an input signal, as mentioned above.

According to some embodiments of the invention, a new computer implemented method is provided for increasing a resolution of an input image, the method comprising:

constructing an image-specific deep learning neural network (DLNN), configured specifically for increasing resolution of an input image;

training the DLNN using a training set, comprising pairs of training targets and their corresponding training inputs, generated from the input image; and applying the trained DLNN on the input image, wherein the input image is provided as an input to the trained DLNN, to obtain an output of a higher-resolution image thereof.

According to some embodiments, the training set is extracted and/or generated solely from the input image.

According to some embodiments, the DLNN configuration is constructed by means of number of nodes, number of layers, and their inter connections. According to some embodiments, the network architecture is determined by the selected super-resolution task, and wherein the weights in the network are specific to the input image (learned by training on the examples extracted from the input image).

According to some embodiments, resolution of each of the training-inputs is lower than resolution of its corresponding training-target.

According to some embodiments, the training targets and training inputs are extracted from at least one of: different parts of the input image, different dimensions of the input image.

According to some embodiments, the method further comprising providing the training set by:

generating the training-targets from the input image; and generating the corresponding training-input for each of the training-targets, by downscaling resolution of the training-targets.

According to some embodiments, the generating of the training-targets is configured to at least partially preserve cross-scale internal recurrence within the input image.

According to some embodiments, the generating of the training-targets comprises transforming the input image by at least one of the following transformations:

rotating the input image to at least one angle, around at least one axis;

mirror reflecting the input image, around at least one axis;

scaling the input image along at least one axis;

cropping part of the input image;

applying a color transformation on the input image applying an intensity transformation on the input image;

applying a filter on the input image;

applying a linear transformation on the input image;

applying a non-linear transformation on the input image;

applying the identity transformation; and any combination thereof.

According to some embodiments, the downscaling comprises lowering resolution of the training-targets, using a desired super resolution (SR) scale factor (s).

According to some embodiments, the downscaling is gradual, provided via several intermediate SR scale factors.

According to some embodiments, the training is further provided using crops of at least some of the training-targets and their corresponding training-input crops.

According to some embodiments, the training is further performed using an external training set, provided by other images.

According to some embodiments, the method further comprising using the trained DLNN to estimate a degradation underlying the input image. According to some embodiments, the estimated degradation is at least one of: a blur kernel, a non-uniform blur-field, a super-resolution downscaling kernel, a noise type, a compression type.

According to some embodiments, the step of training the DLNN comprises a step of decreasing the learning rate of the DLNN, wherein the learning rate is computed using the ratio between the slope of the last N training errors and the deviations of the last N training errors with respect to the slope (N is an integer number>0).

According to some embodiments, the method is implemented via at least one device selected from a group consisting of: a computer, a camera, a mobile phone, a screen, a photo editing software, a projector, a computer chip, a hardware platform.

It is another object of the present invention to provide a new transient or non-transient new computer readable medium (CRM) that, when loaded into a memory of a computing device and executed by at least one processor of the computing device, configured to execute the steps of a computer implemented method for increasing a resolution of an input image, as mentioned above.

According to some embodiments of the invention, a new computer implemented method is provided for accelerating a training of a Deep Learning Neural Network (DLNN) the method comprising a step of decreasing the learning rate of the DLNN, wherein the learning rate is computed using the ratio between the slope of the last N training errors and the deviations of the last N training errors with respect to the slope (N is an integer number>0).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A, 1B, 1C and 1D demonstrate Super resolution (SR) of real images (with unknown low resolution (LR) acquisition process), where real-world images rarely obey the 'ideal conditions' assumed by supervised SR methods; FIGS. 1A and 1C demonstrate old historic photos; FIG. 1B demonstrate an image taken by a smartphone; and FIG. 1D demonstrate a random image taken from the Internet;

FIGS. 2A, 2B, 2C, 2D, 2E, 2F, 2G and 2H demonstrate SR of 'non-ideal' LR images via a controlled experiment; FIGS. 2A-2D demonstrate a LR image generated with aliasing (downscaling kernel is a delta function); FIGS. 2E-2H demonstrate a LR image generated with a non-ideal (gaussian) downscaling kernel (assumed unknown by the currently provided ZSSR method);

FIGS. 3A, 2B, 3C and 3D demonstrate the internal predictive power of image-specific information;

FIGS. 5A, 5B, 5C, 5D and 5E demonstrate several examples for the recovering of an input images with strong internal repetitive structures (FIG. 5A);

Figures 4A, 4B:
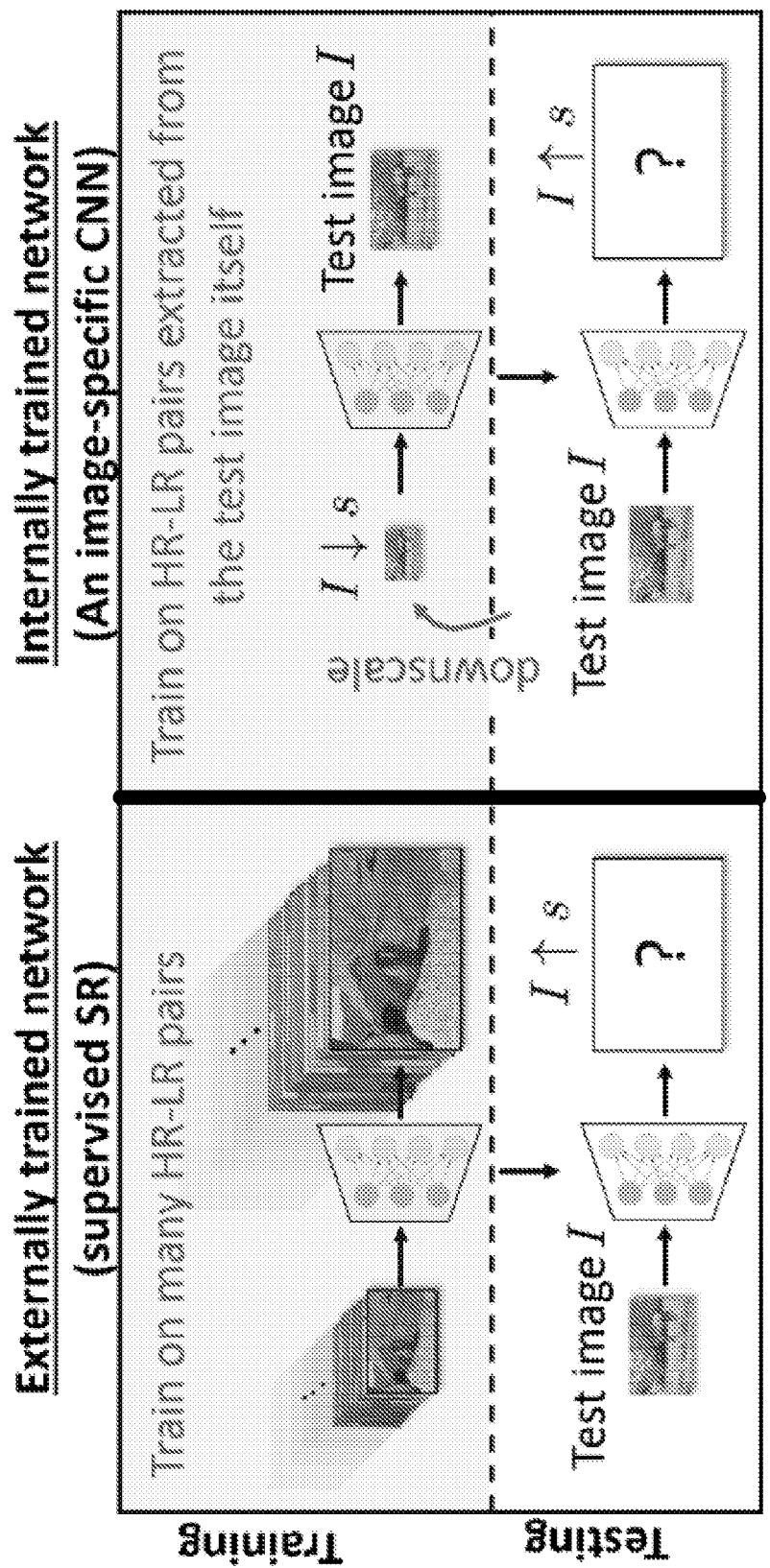
FIGS. 4A and 4B demonstrate an externally-supervised SR CNN (FIG. 4A) vs. the currently provided image-Specific CNN—"Zero-Shot" SR (FIG. 4B), according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

1. Introduction

According to some embodiments of the invention, a "Zero-Shot" Super-Resolution (ZSSR) is demonstrated, which exploits the power of deep learning, without relying on any prior image examples or prior training. According to some embodiments, the internal recurrence of information within a single image is exploited to train a small image-specific convolutional neural network (CNN) at "test time", on examples extracted solely from the LR input image itself (i.e., internal self-supervision). As such, the CNN can be adapted to different settings per image. This allows to perform SR on real images, where the acquisition process is unknown and non-ideal (see example results in FIGS. 1A-1D and 2A-2H). On 'non-ideal' images, the presented method outperforms externally-trained SotA SR methods by a large margin.

The recurrence of small pieces of information (e.g., small image patches) across scales of a single image, was shown to be a very strong property of natural images [Glasner et al.; M. Zontak and M. Irani. *Internal statistics of a single natural image.* In *IEEE Conference on Computer Vision and Pattern Recognition (CVPR)*, June 2011—"Zontak et al. 2011"]. This formed the basis for many unsupervised image enhancement methods, including unsupervised SR [Glasner et al., Freedman et al., Huang et al.], Blind-SR [T. Michaeli and M. Irani. *Nonparametric blind super-resolution.* In *International Conference on Computer Vision (ICCV)*, 2013—"Michaeli et al. 2013"] (when the downscaling kernel is unknown), Blind-Deblurring [T. Michaeli and M. Irani. *Blind deblurring using internal patch recurrence.* In *European Conference on Computer Vision (ECCV)*. 2014—"Michaeli et al. 2014"; Y. Bahat, N. Efrat, and M. Irani. *Non-uniform blind deblurring by re-blurring.* In *ICCV,* 2017—"Bahat et al. 2017"], Blind-Dehazing [Y. Bahat and M. Irani. *Blind dehazing using internal patch recurrence.* In *ICCP,* 2016—"Bahat et al. 2016"], and more. While such unsupervised methods can exploit image-specific information (hence are less subject to the above-mentioned supervised restrictions), they typically rely on simple Euclidian similarity of small image patches, of predefined size (typically 5×5), using K-nearest-neighbors search. As such, they do not generalize well to patches that do not exist in the LR image, nor to new implicitly learned similarity measures, nor can they adapt to non-uniform sizes of repeating structures inside the image.

According to some embodiments of the invention, the currently disclosed image-specific CNN leverages on the power of the cross-scale internal recurrence of image-specific information, without being restricted by the above-mentioned limitations of patch-based methods. According to some embodiments, a CNN is trained to infer complex image-specific HR-LR relations from the LR image and its downscaled versions (self-supervision). Then those learned relations are applied on the LR input image to produce the HR output. This outperforms unsupervised patch-based SR by a large margin.

Since the visual entropy inside a single image is much smaller than in a general external collection of images [Zontak et al. 2011], a small and simple CNN suffices for this image-specific task. Hence, even though the currently provided network is trained at "test time", its train+test runtime is comparable to the test runtime of SotA supervised CNNs. Interestingly, the currently provided image-specific CNN produces impressive results (although not SotA) on the 'ideal' benchmark datasets used by the SotA supervised methods (even though the current CNN is small and has not been pretrained), and surpasses SotA supervised SR by a large margin on 'non-ideal' images. Both visual and empirical evidence of these statements are provided in the following.

The term "Zero-Shot" used herein, is based on the domains of recognition/classification. Note however, that unlike these approaches for Zero-Shot Learning [Y. Xian, B. Schiele, and Z. Akata. *Zero-shot learning—the Good, the*

Bad and the Ugly. In *CVPR*, 2017—"Xian et al."] or One-shot Learning [A. Santoro, S. Bartunov, M. Botvinick, D. Wierstra, and T. P. Lillicrap. *Meta-learning with memory-augmented neural networks*. In *International Conference on Machine Learning (ICML)*" Santoro et al."], the currently provided approach does not require any side information/attributes or any additional images. It may only have a single test image at hand, one of a kind, and nothing else. Nevertheless, when additional information is available and provided (e.g., the downscaling kernel can be estimated directly from the test image using [Michaeli et al. 2013]), the currently provided image-specific CNN can make good use of this at test time, to further improve the results.

The contributions of the currently presented methods are therefore several-fold:
  i. This is the first unsupervised CNN-based SR method.
  ii. It can handle non-ideal imaging conditions, and a wide variety of images and data types (even if encountered for the first time).
  iii. It does not require pretraining and can be run with modest amounts of computational resources.
  iv. It can be applied for SR to any size and with any aspect-ratio.
  v. It can be adapted to known as well as unknown imaging conditions (at test time).
  vi. It provides SotA SR results on images taken with 'non-ideal' conditions, and competitive results on 'ideal' conditions for which SotA supervised methods were trained on.

2. The Power of Internal Image Statistics

Fundamental to the currently presented approach is the fact that natural images have strong internal data repetition. For example, small image patches (e.g., 5×5, 7×7) were shown to repeat many times inside a single image, both within the same scale, as well as across different image scales. This observation was empirically verified by [Glasner et al., Zontak et al. 2011] using hundreds of natural images, and was shown to be true for almost any small patch in almost any natural image.

FIGS. 3A-3D demonstrate the internal predictive power of image-specific information; showing sections of input image (FIG. 3A) vs. Bicubic interpolation (FIG. 3B) vs. internal patch based SR [Glasner et al.] (FIG. 3C) vs. Supervised based SR [VDSR] (FIG. 3D). Simple unsupervised internal-SR [Glasner et al.] is able to reconstruct the tiny handrail in the tiny balconies, whereas externally-trained SotA SR methods fail to do so. Evidence to the existence of those tiny handrails exists only internally, inside this image, at a different location and scale (in one of the larger balconies). Such evidence is not found in any external database of images (no matter how large it is).

FIG. 3C shows an example of a simple single-image SR based on internal patch recurrence (courtesy of Glasner et al.). Note that it is able to recover the tiny handrails in the tiny balconies, since evidence to their existence is found elsewhere inside this image, in one of the larger balconies. In fact, the only evidence to the existence of these tiny handrails exists internally, inside this image, at a different location and different scale. It cannot be found in any external database of examples, no matter how large is the dataset. As can be seen, SotA SR methods fail to recover this image-specific information when relying on externally trained images. While the strong internal predictive-power is exemplified here using a 'fractal-like' image, the internal predictive-power was analyzed and shown to be strong for almost any natural image [Glasner et al.].

In fact, it was empirically shown by [Zontak et al. 2011] that the internal entropy of patches inside a single image is much smaller than the external entropy of patches in a general collection of natural images. This further gave rise to the observation that internal image statistics often provides stronger predictive-power than external statistics obtained from a general image collection. This preference was further shown to be particularly strong under growing uncertainty and image degradations (see [Zontak et al. 2011; I. Mosseri, M. Zontak, and M Irani. *Combining the power of internal and external denoising*. In *ICCP*, 2013—"Mosseri et al."] for details).

3. Methods

Figure 7:
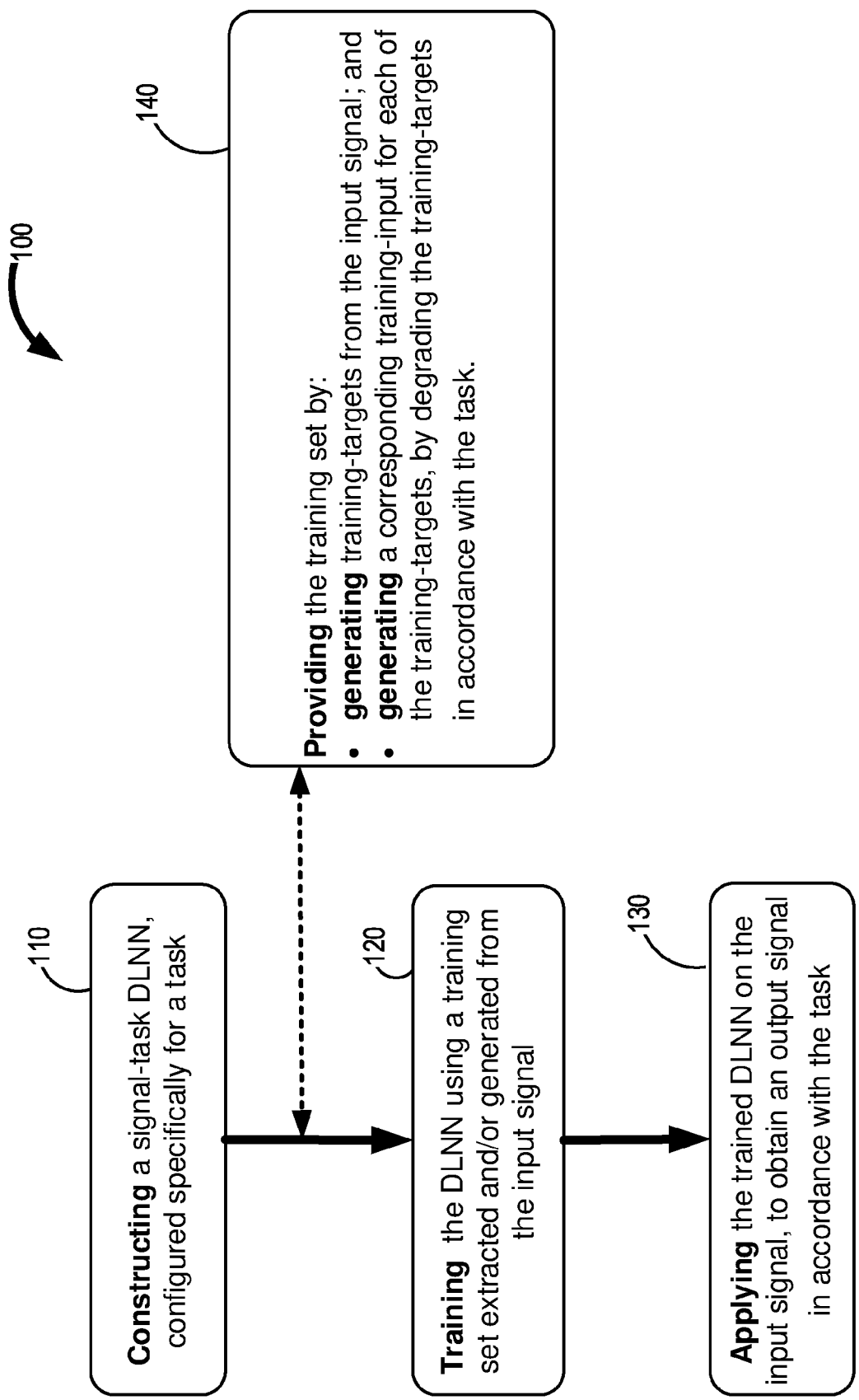
FIG. 7 demonstrates steps of a method for performing a task on an input signal, according to some embodiments of the invention.

According to some embodiments of the invention, and as demonstrated in FIG. 7, a new computer implemented method 100 is provided for performing a task on an input signal, the method comprising:
constructing 110 a signal-task deep learning neural network (DLNN), configured specifically for the task;
training 120 the DLNN using a training set extracted and/or generated from the input signal; and
applying 130 the trained DLNN on the input signal, to obtain an output signal in accordance with the task.

According to some embodiments, the training set is extracted and/or generated solely from the input signal.

Figure 9:
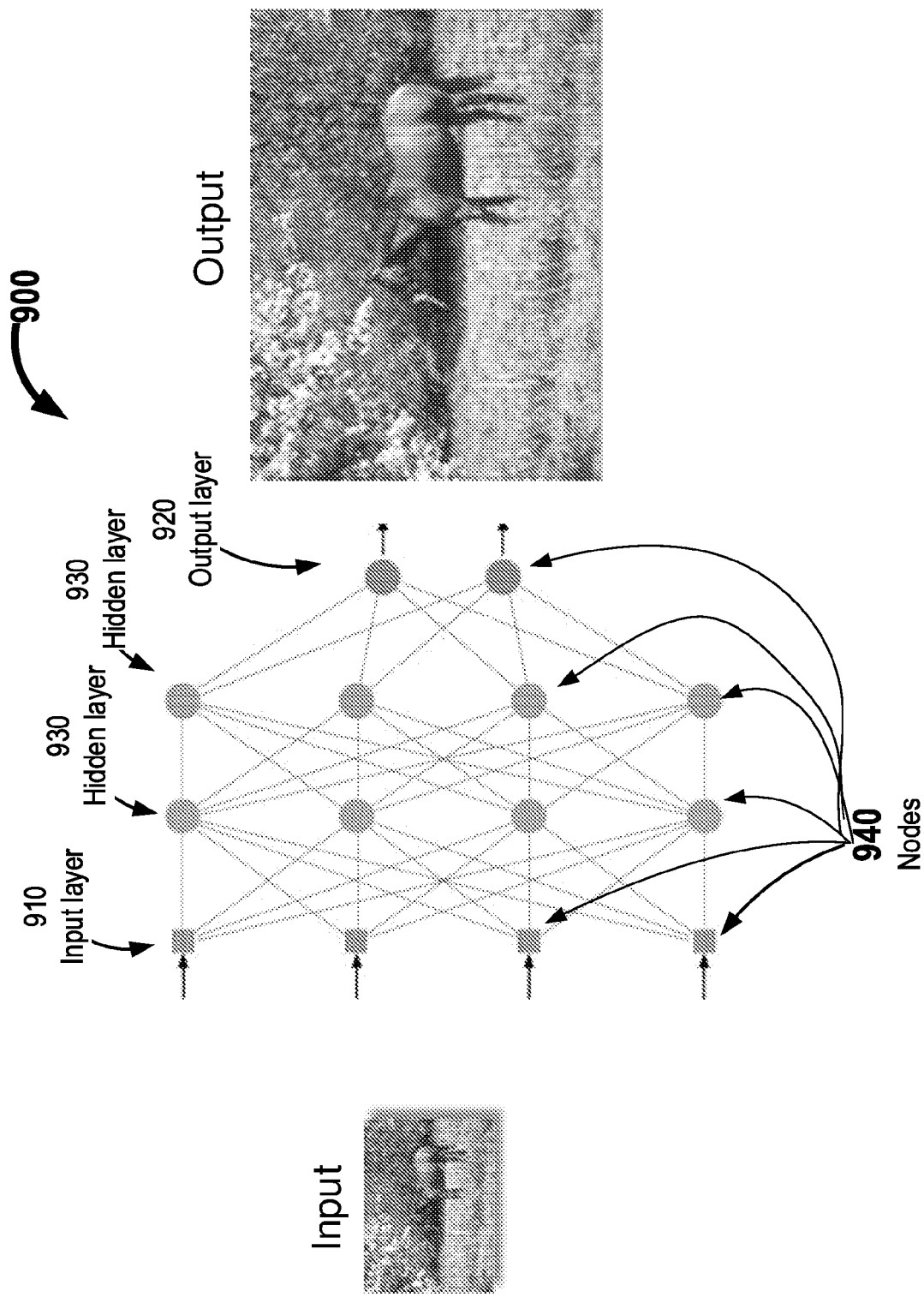
FIG. 9 demonstrates a non-limiting example for a configuration of a neural network.

According to some embodiment, the term "deep learning neural network (DLNN)", used herein, refers to an artificial neural network (ANN) 900 with multiple layers 910,920,930 of nodes 940 between the input 910 and output 920 layers, as demonstrated in FIG. 9, which shows a non-limiting example for a configuration of a neural network. According to some embodiments, at the training stage, the DLNN finds the correct mathematical manipulation (nodes' weights) to turn the input into the output (target output).

According to some embodiments of the present invention, the DLNN configuration is constructed by means of number of nodes, number of layers, and their inter connections. According to some embodiments, the network architecture is determined by the selected task (super-resolution, denoising, etc.) and wherein the nodes' weights in the network are specific to the input signal (learned by training on the examples extracted from the input signal).

According to some embodiments, the training set comprises pairs of training-targets and training-inputs, extracted from at least one of: different parts of the input signal, different dimensions of the input signal.

According to some embodiments, the method further comprising providing the training set 140 by:
  generating training-targets from the input signal; and
  generating a corresponding training-input for each of the training-targets, by degrading the training-targets in accordance with the task.

According to some embodiments, the generating of the training-targets is obtained by transforming the input signal by at least one of the following transformations:
  rotating the input signal to at least one angle, around at least one axis;
  mirror reflecting the input signal, around at least one axis;
  scaling the input signal along at least one axis;
  cropping part of the input signal;
  applying an intensity transformation on the input signal;
  applying a filter on the input signal;
  applying a linear transformation on the input signal;

applying a non-linear transformation on the input signal;
applying the identity transformation on the input signal; and any combination thereof.

According to some embodiments, the input signal is at least one selected from the group consisting of: image, video sequence, medical signal, MRI, fMRI, audio, an N-dimensional signal (N is an integer number>0).

According to some embodiments, the task is at least one selected from the group consisting: super-resolution, deblurring, denoising, completion of missing data, distortion correction, correcting compression artifacts, dehazing (haze removal), signal-enhancement, signal-manipulation, degradation removal.

According to some embodiments, the training is further performed using an external training set, provided by other signals.

According to some embodiments, the method further comprising using the trained DLNN to estimate a degradation underlying the input signal. According to some embodiments, the estimated degradation is at least one of: a blur kernel, a non-uniform blur-field, a super-resolution downscaling kernel, a noise type, a compression type.

According to some embodiments, the step of training the DLNN comprises a step of decreasing the learning rate of the DLNN, wherein the learning rate is computed using the ratio between the slope of the last N training errors and the deviations of the last N training errors with respect to the slope (N is an integer number>0).

According to some embodiments, the method is implemented via at least one device selected from a group consisting of: a computer, a camera, a mobile phone, a screen, a photo editing software, a projector, a computer chip, a hardware platform.

It is another object of the present invention to provide a new transient or non-transient new computer readable medium (CRM) that, when loaded into a memory of a computing device and executed by at least one processor of the computing device, configured to execute the steps of the computer implemented method 100 for performing a task on an input signal, as mentioned above.

Figure 8:
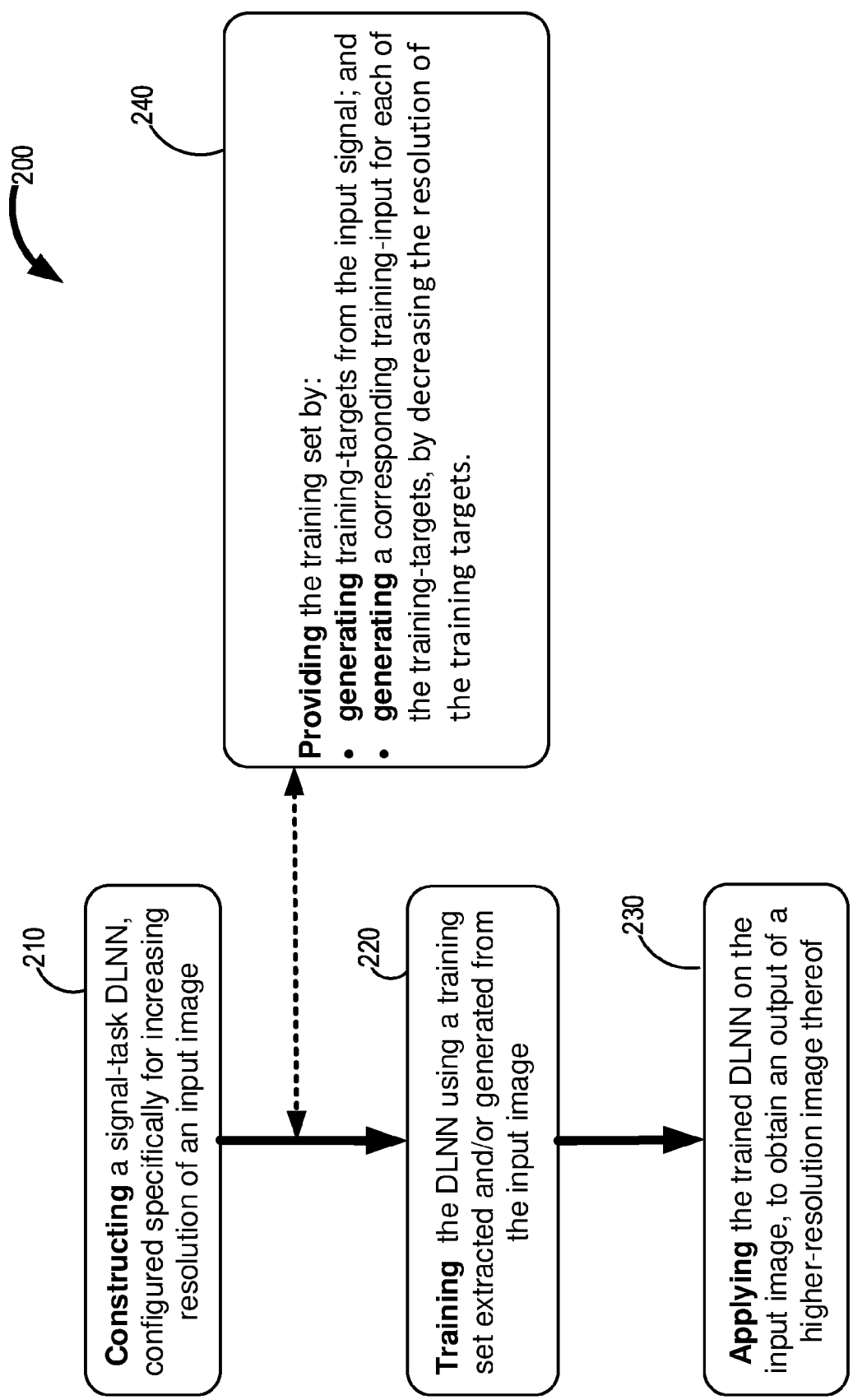
FIG. 8 demonstrates steps of a method for increasing a resolution of an input image, according to some embodiments of the invention.

According to some embodiments of the invention, and as demonstrated in FIG. 8, a new computer implemented method 200 is provided for increasing a resolution of an input image, the method comprising:
constructing 210 an image-specific deep learning neural network (DLNN), configured specifically for increasing resolution of an input image;
training 220 the DLNN using a training set generated from the input image; and
applying 230 the trained DLNN on the input image to obtain an output of a higher-resolution image thereof.

According to some embodiments, the training set is extracted and/or generated solely from the input image.

According to some embodiments, the DLNN configuration is constructed by means of number of nodes, number of layers, and their inter connections. According to some embodiments, the network architecture is determined by the selected super-resolution task, and wherein the weights in the network are specific to the input image (learned by training on the examples extracted from the input image).

According to some embodiments, the training set comprises pairs of training-targets and their corresponding training-inputs, wherein resolution of each of the training-inputs is lower than resolution of its corresponding training-target.

According to some embodiments, the training targets and training inputs are extract from at least one of: different parts of the input image, different dimensions of the input image.

According to some embodiments, the method further comprising providing the training set 240 by:
generating training-targets from the input image; and
generating a corresponding training-input for each of the training-targets, by downscaling resolution of the training-targets.

According to some embodiments, the generating of the training-targets is configured to at least partially preserve cross-scale internal recurrence within the input image.

According to some embodiments, the generating of the training-targets comprises transforming the input image by at least one of the following transformations:
rotating the input image to at least one angle, around at least one axis;
mirror reflecting the input image, around at least one axis;
scaling the input image along at least one axis;
cropping part of the input image;
applying a color transformation on the input image
applying an intensity transformation on the input image;
applying a filter on the input image;
applying a linear transformation on the input image;
applying a non-linear transformation on the input image;
applying the identity transformation; and
any combination thereof.

According to some embodiments, the downscaling comprises lowering resolution of the training-targets, using a desired super resolution (SR) scale factor (s).

According to some embodiments, the downscaling is gradual, provided via several intermediate SR scale factors.

According to some embodiments, the training is further provided using crops of at least some of the training-targets and their corresponding training-input crops.

According to some embodiments, the training is further performed using an external training set, provided by other images.

According to some embodiments, the method further comprising using the trained DLNN to estimate a degradation underlying the input image. According to some embodiments, the estimated degradation is at least one of: a blur kernel, a non-uniform blur-field, a super-resolution downscaling kernel, a noise type, a compression type.

According to some embodiments, the step of training the DLNN comprises a step of decreasing the learning rate of the DLNN, wherein the learning rate is computed using the ratio between the slope of the last N training errors and the deviations of the last N training errors with respect to the slope (N is an integer number>0).

According to some embodiments, the method is implemented via at least one device selected from a group consisting of: a computer, a camera, a mobile phone, a screen, a photo editing software, a projector, a computer chip, a hardware platform.

It is another object of the present invention to provide a new transient or non-transient new computer readable medium (CRM) that, when loaded into a memory of a computing device and executed by at least one processor of the computing device, configured to execute the steps of the computer implemented method 200 for increasing a resolution of an input image, as mentioned above.

According to some embodiments of the invention, a new computer implemented method is provided for accelerating a training of a Deep Learning Neural Network (DLNN) the method comprising a step of decreasing the learning rate of the DLNN, wherein the learning rate is computed using the ratio between the slope of the last N training errors and the deviations of the last N training errors with respect to the slope (N is an integer number>0).

3.1. Image-Specific CNN

Reference is made to FIGS. 4A and 4B which demonstrate an externally-supervised SR CNN (FIG. 4A) vs. the currently provided image-Specific CNN—"Zero-Shot" SR (FIG. 4B), according to some embodiments of the invention. FIG. 4A demonstrates an externally-supervised SR CNNs which are pre-trained on large external databases of images. The resulting very deep network is then applied to the test image I. FIG. 4B demonstrates the currently proposed method (ZSSR): where a small image-specific CNN is trained on examples extracted internally, from the test image itself. It learns how to recover the test image I from its coarser resolutions. The resulting self-supervised network is then applied to the LR image I to produce its HR output.

The currently provided image-specific CNN combines the predictive power and low entropy of internal image-specific information, with the generalization capabilities of deep-learning. Given a test image I, with no external examples available to train on, the current methods construct an Image-Specific CNN tailored to solve the SR task for this specific image. The current methods train the current CNN on examples extracted from the test image itself. Such examples are obtained by downscaling the LR image I, to generate a lower-resolution version of itself, I↓s (where s is the desired SR scale factor). The current methods use a relatively light CNN, and train it to reconstruct the test image I from its lower-resolution version I↓s (top part of FIG. 4B). The current methods then apply the resulting trained CNN to the test image I, now using I as the LR input to the network, in order to construct the desired HR output I↑s (bottom of FIG. 4B). Note that the trained CNN is fully convolutional, hence can be applied to images of different sizes.

Since the currently provided "training set" consists of one instance only (the test image), the current methods employ data augmentation on I to extract more LR-HR example-pairs to train on. The augmentation is done by transforming the test image I to many smaller versions of itself (I=$I_0$, $I_1$, $I_2$, ..., $I_n$). These play the role of the HR supervision and are called "HR fathers". Each of the HR fathers is then downscaled by the desired SR scale-factor s to obtain the "LR sons", which form the input training instances. The resulting training set consists of many image-specific LR-HR example pairs. The network can then stochastically train over these pairs.

According to some embodiments, the currently presented methods further enrich the training set by transforming each LR-HR pair using, for example, 4 rotations (0°, 90°, 180°, 270°) and their mirror reflections in the vertical and horizontal directions. This adds ×8 more image-specific training examples.

According to some embodiments, for the sake of robustness, as well as to allow large SR scale factors s even from very small LR images, the SR is performed gradually [Glasner et al.; R. Timofte, R. Rothe, and L. Van Gool. *Seven ways to improve example-based single image super resolution*. In *The IEEE Conference on Computer Vision and Pattern Recognition (CVPR)*, June 2016—"Timofte et al. 2016"]. The currently provided algorithm is applied for several intermediate scale-factors ($s_1$, $s_2$, ..., $s_m$=s). At each intermediate scale $s_i$, the current methods add the generated SR image $HR_i$ and its downscaled/rotated versions to the gradually growing training-set, as new HR fathers. According to some embodiments, the currently provided methods downscale those (as well as the previous smaller 'HR examples') by the next gradual scale factor $s_{i+1}$, to generate the new LR-HR training example pairs. This is repeated until reaching the full desired resolution increase s.

3.2. Architecture & Optimization

Supervised CNNs, which train on a large and diverse external collection of LR-HR image examples, must capture in their learned weights the large diversity of all possible LR-HR relations. As such, these networks tend to be extremely deep and very complex. In contrast, the diversity of the LR-HR relations within a single image is significantly smaller, hence can be encoded by a much smaller and simpler image-specific network.

According to some embodiments, the term "Learning-rate" is used herein, which is a hyper-parameter of an optimization method called "Gradient descent". In its most basic form, it can be formalized as follows:

$$a_{n+1}=a_n-\gamma \nabla F(a_n)$$

Here $\gamma$ is the learning-rate. F is some function and $a_n$ is the set of parameters to optimize. For intuition: Gradient-descent is optimizing by always taking steps towards the steepest possible descent. learning-rate is the size of that step.

According to some embodiments, for deep-learning the function is a neural network and the parameters are the weights of the network.

As a basic approach, learning-rate can stay constant throughout the optimization process, however it is common to have a "learning-rate policy", which updates it. Usually updating means decreasing it gradually. The most common approaches are:

1. Constantly exponentially decaying learning-rate:

GAMMA_new=GAMMA*BETA, where 0<BETA<1. (usually BETA=0.99).
2. In special iterations decreasing the learning-rate drastically:

GAMMA_new=GAMMA*0.1 if iteration is 40000, 100000 or 200000 (example).
3. Plateau in validation—if the validation-error or the training-loss hasn't decreased more than some threshold during the last K iterations/epochs then:

GAMMA_new=GAMMA*0.1.

Since the networks of the currently provided methods must train very-fast and such that every millisecond counts, according to some embodiments, a new policy is used:
   Every K iterations, a linear curve is fitted to the last K validation-errors and the slope is checked (it is noted that the above mentioned $3^{rd}$ policy could just decide on decreasing if slope>some threshold) (slope is almost always negative).

According to some embodiments, the Mean-Squared-Error (MSE) of the fitting is examined (mean of the squares of the differences between the last K validation-errors to the curve, sometimes known as the xi squared or goodness of fitting). According to some embodiments, the currently provided decision is based on the ratio between the square root of the MSE and the slope of the ratio. It has shown to accelerate the optimization process significantly.

According to some embodiments, the currently provided methods use a simple, fully convolutional network, with 8 hidden layers, each has 64 channels. According to some embodiments, the current methods use ReLU activations on each layer. The network input is interpolated to the output size. As done in previous CNN-based SR methods [J. Kim, J. Kwon Lee, and K. Mu Lee. *Accurate image super-resolution using very deep convolutional networks*. In *The IEEE Conference on Computer Vision and Pattern Recognition (CVPR) Workshops*, pages 1646-1654, June 2016—"Kim (a) et al."]; [J. Kim, J. K. Lee, and K. M. Lee. *Deeply-recursive convolutional network for image super-resolution*. In *The IEEE Conference on Computer Vision and Pattern Recognition (CVPR Oral)*, June 2016—"Kim (b) et al."]; [K. H. X. T. Chao Dong, Chen Change Loy. *Learning a deep convolutional network for image super-resolution*. In *European Conference on Computer Vision (ECCV)*, 2014—"Chao Dong et al."], the current methods only learn the residual between the interpolated LR and its HR parent. According to some embodiments, the current methods use $L_1$ loss with ADAM optimizer [D. P. Kingma and J. Ba. *Adam: A method for stochastic optimization. CoRR, abs/*1412.6980, 2014—"Kingma et al."].

According to some embodiments, the current methods start for example with a learning rate of 0.001. According to some embodiments, the current methods periodically take a linear fit of the reconstruction error, and if the standard deviation is greater by a factor than the slope of the linear fit, the current methods divide the learning rate by ten. According to some embodiments, the current methods stop, for example, when it gets to a learning rate of $10^{-6}$.

According to some embodiments, in order to accelerate the training stage and make the runtime independent of the size of the test image I, at each iteration the current methods take a random crop of fixed size from a randomly-selected father-son example pair. The crop is typically 128×128 (unless the sampled image-pair is smaller). The probability of sampling an LR-HR example pair at each training iteration is set to be non-uniform and proportional to the size of the HR-father. The closer the size-ratio (between the HR-father and the test image I) is to 1, the higher its probability to be sampled. This reflects the higher reliability of non-synthesized HR examples over synthesize ones.

According to some embodiments, the currently provided methods use a method similar to the geometric self-ensemble proposed in [Lim et al.] (which generates 8 different outputs for the 8 rotations+flips of the test image I, and then combines them). According to some embodiments, the current methods take the median of these 8 outputs rather than their mean. According to some embodiments, the current methods further combine it with the back-projection technique of [M. Irani and S. Peleg. *Improving resolution by image registration. CVGIP: Graphical Model and Image Processing,* 53(3):231-239, 1991—"Irani et al."]; [Glasner et al.], so that each of the 8 output images undergoes several iterations of back-projection and finally the median image is corrected by back-projection as well.

RUNTIME: According to some embodiments, although training is done at test time, the average runtime per image is 54 sec for a single increase in SR scale-factor (on a Tesla K-80 GPU). According to some embodiments, the average runtime per image is 9 sec for a single increase in SR scale-factor (on a Tesla V-100 GPU). This runtime is independent of the image size or the relative SR scale-factor s (this is a result of the equally sized random crops used in training; the final test runtime is negligible with respect to training iterations). Nevertheless, better SR results are obtained when using a gradual increase in resolution. For example, a gradual increase using six intermediate scale-factors typically improves the Peak Signal-to-Noise Ratio (PSNR) by ~0.2 dB, but increases the runtime to ~5 min per image (for the Tesla K-80 GPU) or to ~1 min (for the Tesla V-100 GPU). There is therefore a tradeoff between runtime and the output quality, which is up to the user to choose. Most of the results reported herein were produced using six intermediate scale-factors.

For comparison, the test-time of the leading EDSR+ [Lim et al.] (on the same platform) is ~20 sec for SR×2 on a 200×200 image. However, EDSR's run time grows quadratically with the image size, and reaches 5 min for an 800×800 image. Beyond that size, the current network is faster than EDSR+ [Lim et al.].

3.3. Adapting to the Test Image

When the acquisition parameters of the LR images from their HR ones are fixed for all images (e.g., same downscaling kernel, high-quality imaging conditions), the known supervised SR methods achieve an incredible performance [R. Timofte, E. Agustsson, M.-H. Van Gool, Luc Yang, L. Zhang, et al. *Ntire 2017 challenge on single image super-resolution: Methods and results*. In *The IEEE Conference on Computer Vision and Pattern Recognition (CVPR) Workshops*, July 2017—"Timofte et al. 2017"]. In practice, however, the acquisition process tends to change from image to image, since cameras/sensors differ (e.g., different lens types and PSFs), as well as the individual imaging conditions (e.g., subtle involuntary camera shake when taking the photo, poor visibility conditions, etc.). This results in different downscaling kernels, different noise characteristics, various compression artifacts, etc. One could not practically train for all possible image acquisition configurations/settings. Moreover, a single supervised CNN is unlikely to perform well for all possible types of degradations/settings. To obtain good performance, one would need many different specialized SR networks, each trained (for days or weeks) on different types of degradations/settings.

This is where the advantage of the current image-specific network comes in. The currently presented network can be adapted to the specific degradations/settings of the test image at hand, at test time. The presented network can receive from the user, at test time, any of the following parameters:
  (i) The desired downscaling kernel (when no kernel is provided, the bicubic kernel serves as a default).
  (ii) The desired SR scale-factor s.
  (iii) The desired number of gradual scale increases (a tradeoff between speed and quality—the default is six).
  (iv) Whether to enforce Back-projection between the LR and HR image (the default is 'Yes').
  (v) Whether to add 'noise' to the LR sons in each LR-HR example pair extracted from the LR test image (the default is 'No').

The last two parameters (cancelling the Backprojection and adding noise) allow the handling of SR of poor-quality LR images (whether due to sensor noise in the image, JPEG compression artifacts, etc.). According to some embodiments, adding a small amount of Gaussian noise (with zero mean and a small standard-deviation of ~five grayscales), improves the performance for a wide variety of degradations (Gaussian noise, speckle noise, JPEG artifacts, and more). It is attributed that this phenomenon to the fact that image-specific information tends to repeat across scales, whereas noise artifacts do not [M. Zontak, I. Mosseri, and M. Irani.

*Separating signal from noise using patch recurrence across scales.* In *CVPR*, 2013—"Zontak et al. 2013"]. According to some embodiments, adding a bit of synthetic noise to the LR sons (but not to their HR fathers) teaches the network to ignore uncorrelated cross-scale information (the noise), while learning to increase the resolution of correlated information (the signal details).

Indeed, the currently tested experiments show that for low-quality LR images, and for a wide variety of degradation types, the image-specific CNN obtains significantly better SR results than SotA EDSR+ [Lim et al.] (as in the following Sec. 4). Similarly, in the case of non-ideal downscaling kernels, the image-specific CNN obtains a significant improvement over SotA (even in the absence of any noise). When the downscaling Kernel is known (e.g., a sensor with a known PSF), it can be provided to the current network. When the downscaling kernel is unknown (which is usually the case), a rough estimate of the kernel can be computed directly from the test image itself (e.g., using the method of [Michaeli et al. 2013]). Such rough kernel estimations suffice to obtain+1 dB improvement over EDSR+ on non-ideal kernels (see examples in FIGS. 1A-1D and 2A-2H, and empirical evaluations in Sec. 4).

Note that providing the estimated downscaling kernel to externally-supervised SotA SR methods at test time, would be of no use. They would need to exhaustively re-train a new network on a new collection of LR-HR pairs, generated with this specific (non-parametric) downscaling kernel.

4. Experiments & Results

The currently provided methods 'Zero-Shot SR' (ZSSR) is primarily aimed at real LR images obtained with realistic (unknown and varying) acquisition setting. These usually have no HR ground truth, hence are evaluated visually (as in FIGS. 1A-1D).

FIGS. 1A, 1B, 1C and 1D demonstrate Super resolution (SR) of real images (with unknown low resolution (LR) acquisition process), where real-world images rarely obey the 'ideal conditions' assumed by supervised SR methods; FIGS. 1A and 1C demonstrate old historic photos; FIG. 1B demonstrate an image taken by a smartphone; and FIG. 1D demonstrate a random image taken from the Internet; all showing sections of input image vs. the ESSR reconstruction method vs. the currently provided ZSSR reconstruction method.

In order to quantitatively evaluate ZSSR's performance, several controlled experiments were performed, on a variety of settings. Interestingly, ZSSR produces competitive results (although not SotA) on the 'ideal' benchmark datasets, for which the SotA supervised methods train and specialize (even though the CNN is small, and has not been pretrained). However, on 'non-ideal' datasets, ZSSR surpasses SotA SR by a large margin. All reported numerical results were produced using the evaluation script of [Kim (a) et al.; Kim (b) et al.].

4.1. The 'Ideal' Case

While the 'ideal' case is not the aim of ZSSR, it was tested also on the standard SR benchmarks of 'ideal' LR images. In these benchmarks, the LR images are ideally downscaled from their HR versions using MATLAB's immersive command (a bicubic kernel down sampling with antialiasing). Table 1 shows that the currently provided image-specific ZSSR achieves competitive results against externally-supervised methods that were exhaustively trained for these conditions. In fact, ZSSR is significantly better than the older SRCNN [Chao Dong et al.], and in some cases achieves comparable or better results than VDSR [Kim (a) et al.] (which was the SotA until a year ago). Within the unsupervised-SR regime, ZSSR outperforms the leading method SelfExSR [Huang et al.] by a large margin.

TABLE 1

Comparison of SR results for the 'ideal' case (bicubic downscaling).

| Dataset | Scale | Supervised | | | Unsupervised | |
|---|---|---|---|---|---|---|
| | | SRCNN [3] | VDSR [8] | EDSR+ [12] | SelfExSR [6] | ZSSR (ours) |
| Set5 | ×2 | 36.66/0.9542 | 37.53/0.9587 | 38.20/0.9606 | 36.49/0.9537 | 37.37/0.9570 |
| | ×3 | 32.75/0.9090 | 33.66/0.9213 | 34.76/0.9290 | 32.58/0.9093 | 33.42/0.9188 |
| | ×4 | 30.48/0.8628 | 31.35/0.8838 | 32.62/0.8984 | 30.31/0.8619 | 31.13/0.8796 |
| Set 14 | ×2 | 32.42/0.9063 | 33.03/0.9124 | 34.02/0.9204 | 32.22/0.9034 | 33.00/0.9108 |
| | ×3 | 29.28/0.8209 | 29.77/0.8314 | 30.66/0.8481 | 29.16/0.8196 | 29.80/0.8304 |
| | ×4 | 27.49/0.7503 | 28.01/0.7674 | 28.94/0.7901 | 27.40/0.7518 | 28.01/0.7651 |
| BSD100 | ×2 | 31.36/0.8879 | 31.90/0.8960 | 32.37/0.9018 | 31.18/0.8855 | 31.65/0.8920 |
| | ×3 | 28.41/0.7863 | 28.82/0.7976 | 29.32/0.8104 | 28.29/0.7840 | 28.67/0.7945 |
| | ×4 | 26.90/0.7101 | 27.29/0.7251 | 27.79/0.7437 | 26.84/0.7106 | 27.12/0.7211 |

FIGS. 5A, 5B, 5C, 5D and 5E demonstrate several examples for the recovering of an input images with strong internal repetitive structures (FIG. 5A); where FIG. 5B demonstrates the ground truth. As shown the currently provided ZSSR (FIG. 5E) tends to surpass VDSR (FIG. 5C), and sometimes also EDSR+ (FIG. 5D), even though the LR image was generated using the 'ideal' supervised setting (i.e., bicubic downscaling). Although this image is not a typical natural image, further analysis shows that the preference for internal learning (via ZSSR) exhibited in FIG. 5E exists not only in 'fractal-like' images, but is also found in general natural images.

Figure 6A:
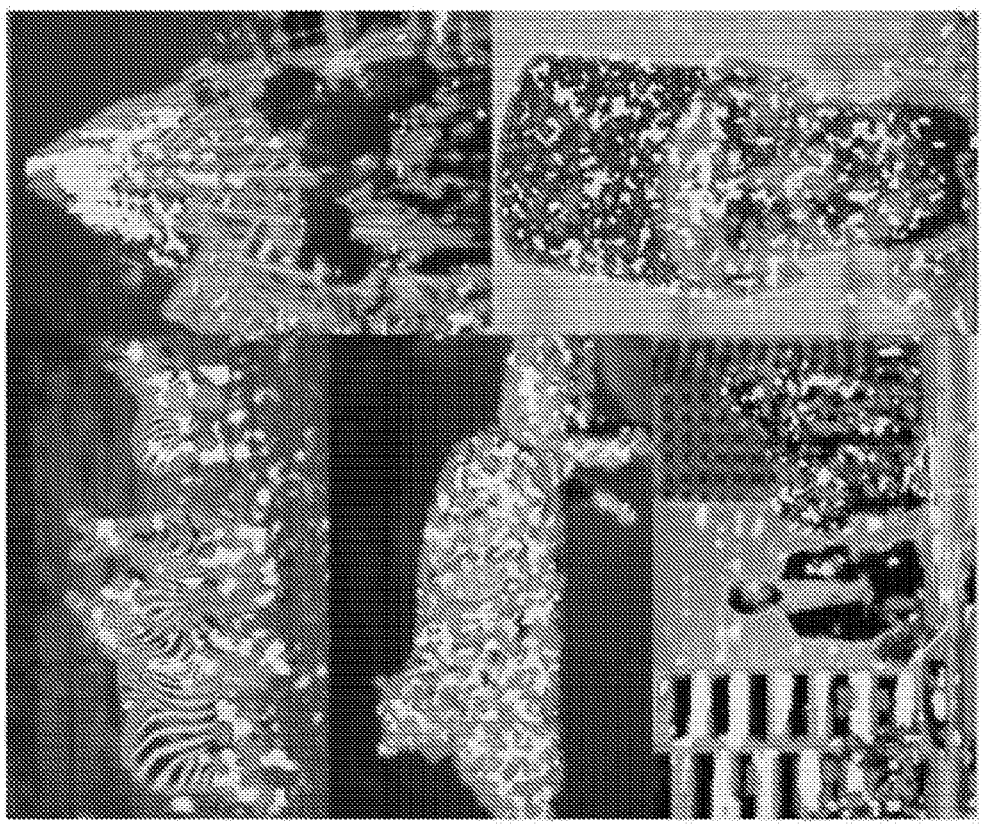
FIGS. 6A and 6B demonstrate a collection of input images (FIG. 6A) and their respective internal vs. external preference (FIG. 6B)
Figure 6B:
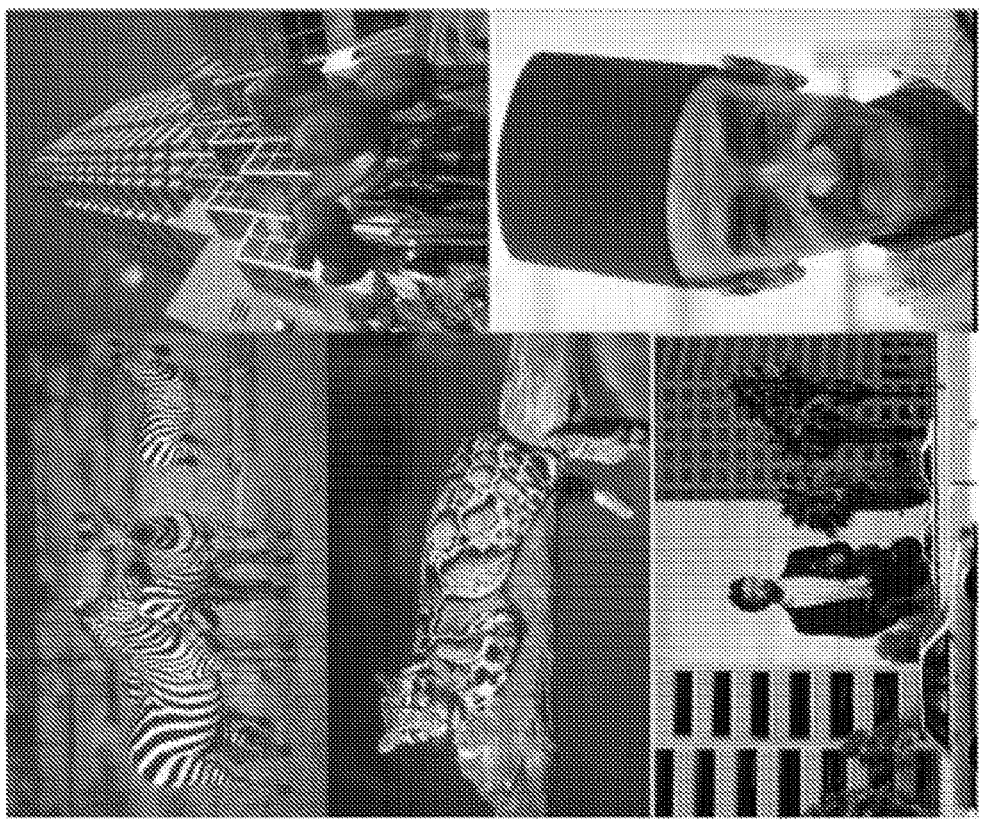

Several such examples are shown FIGS. 6A and 6B which demonstrate a collection of input images (FIG. 6A) and their respective internal vs. external preference (FIG. 6B). Green color demonstrates: pixels that favor Internal-SR (i.e., pixels where ZSSR obtains lower error with respect to the ground-truth HR image). Red color demonstrates: pixels that favor External-SR (EDSR+). It is noted that edges (which are frequent in natural images) prefer External-SR, whereas unique image structures (e.g., the tiny windows at the top of the high building) prefer Internal-SR. Such tiny patters find larger (high-res) examples of themselves elsewhere inside the same image (at a different location/scale).

As can be seen, some of the pixels in the image (those marked in green) benefit more from exploiting internally learned data recurrence (ZSSR) over deeply learned external information, whereas other pixels (those marked in red) benefit more from externally learned data (EDSR+). As expected, the internal approach (ZSSR) is mostly advantageous in image area with high recurrence of information, especially in areas where these patterns are extremely small (of extremely low resolution), like the small windows in the top of the building. Such tiny patters find larger (high-res) examples of themselves elsewhere inside the same image (at a different location/scale). This indicates that there may be potential for further SR improvement (even in the 'ideal' bicubic case), by combining the power of Internal-Learning with External-Learning in a single computational framework. This remains part of our future work.

4.2. The 'Non-Ideal' Case

Real LR images do not tend to be ideally generated. Experiments were conducted with non-ideal cases that result from either:
 (i) non-ideal downscaling kernels (that deviate from the bicubic kernel), and
 (ii) low-quality LR images (e.g., due to noise, compression artifacts, etc.)
In such non-ideal cases, the image-specific ZSSR provides significantly better results than SotA SR methods (by 1-2 dB). These quantities experiments are described next. FIGS. 2A-2H shows a few such visual results. FIGS. 2A, 2B, 2C, and 2D, 2E, 2F, 2G and 2H demonstrate SR of 'non-ideal' LR images via a controlled experiment; FIGS. 2A-2D demonstrate a LR image generated with aliasing (downscaling kernel is a delta function); FIGS. 2E-2H demonstrate a LR image generated with a non-ideal (gaussian) downscaling kernel (assumed unknown by the currently provided ZSSR method). FIGS. 2A-2H are showing examples of input image (FIGS. 2A and 2E) vs. ground truth (PSNR/structural similarity) (FIGS. 2B and 2F) vs. the EDSR recovering method (FIGS. 2C and 2G) vs. the currently provided ZSSR recovering method (FIGS. 2D and 2H).

(A) NON-IDEAL DOWNSCALING KERNELS: The purpose of this experiment is to test more realistic blur kernels with the ability to numerically evaluate the results. For this purpose, a new dataset from BSD100 [D. Martin, C. Fowlkes, D. Tal, and J. Malik. *A database of human segmented natural images and its application to evaluating segmentation algorithms and measuring ecological statistics*. In *Proc. 8th Int'l Conf. Computer Vision*, volume 2, pages 416-423, July 2001—"Martin et al."] was created by downscaling the HR images using random (but reasonably sized) Gaussian kernels. For each image, the covariance matrix $\Sigma$ of its downscaling kernel was chosen to have a random angle $\theta$ and random lengths $\lambda_1$, $\lambda_2$ in each axis:

$$\lambda_1, \lambda_2 \sim U[0, s^2]$$
$$\theta \sim U[0, \pi]$$
$$\Lambda = diag(\lambda_1, \lambda_2)$$
$$U = \begin{bmatrix} \cos(\theta) & -\sin(\theta) \\ \sin(\theta) & \cos(\theta) \end{bmatrix}$$
$$\Sigma = U \Lambda U^t$$

where s is the HR-LR downscaling factor. Thus, each LR image was subsampled by a different random kernel. Table 2 compares the performance currently provided method against the leading externally-supervised SR methods [Lim et al.; Kim (a) et al.]. Also compared is the performance to the unsupervised Blind-SR method of [Michaeli et al. 2013. Two cases were considered for applying ZSSR:
 (i) The more realistic scenario of unknown down-scaling kernel. For this mode [Michaeli et al. 2013] was used to evaluate the kernel directly from the test image and fed it to ZSSR. The unknown SR kernel is estimated in [Michaeli et al. 2013] by seeking a non-parametric downscaling kernel which maximizes the similarity of patches across scales in the LR test image.
 (ii) ZSSR was applied with the true downscaling kernel used to create the LR image. Such a scenario is potentially useful for images obtained by sensors with known specs.

TABLE 2

SR in the presence of unknown downscaling kernels. LR images were generated from the BSD100 dataset using random downscaling kernels (of reasonable size). SR × 2 was then applied to those images.

| VDSR [8] | EDSR+ [12] | Blind-SR [14] | ZSSR [unknown kernel] (ours) | ZSSR [known kernel] (ours) |
|---|---|---|---|---|
| 27.7212/0.7635 | 27.7826/0.7660 | 28.420/0.7834 | 28.8118/0.8306 | 29.6814/0.8414 |

Note that none of the externally-supervised methods are able to benefit from knowing the blur kernel of the test image (whether estimated or real), since they were trained and optimized exhaustively for a specific kernel. Table 2 shows that ZSSR outperforms SotA methods by a very large margin: +1 db for unknown (estimated) kernels, and +2 db when provided the true kernels. Visually, the SR images generated by SotA methods are very blurry (see FIGS. 2A-2H,). Interestingly, the unsupervised Blind-SR method of [Michaeli et al. 2013], which does not use any deep learning, also outperforms SotA SR methods. This further supports the analysis and observations of [A. A. B. N. A. ι. Netalee Efrat, Daniel Glasner. *Accurate blur models vs. image priors in single image super-resolution*. In *ICCV*, 2013—"Netalee et al."], that (i) an accurate downscaling model is more important than sophisticated image priors, and (ii) using the wrong downscaling kernel leads to over-smoothed SR results.

A special case of a non-ideal kernel is the δ kernel, which results in aliasing. This case too, is not handled well by SotA methods (see examples in FIG. 2A-2H).

(B) POOR-QUALITY LR IMAGES: In this experiment, images were tested with different types of quality degradation. To test the robustness of ZSSR in coping with unknown damage, for each image from BSD100 [Martin et al.] a random type of degradation was chosen, out of 3 degradations:
 (i) Gaussian noise [σ=0.05], (ii) Speckle noise [$\sigma=0.05$],
(iii) JPEG compression [quality=45 (By MATLAB standard)].

SR×2 was then applied to those images, without knowing the type of degradation.

Table 3 shows that ZSSR is robust to unknown degradation types, while these typically damage SR supervised methods to the point where bicubic interpolation outperforms the known SotA SR methods.

TABLE 3

SR in the presence of unknown image degradation.

| Bicubic interpolation | EDSR+ [12] | ZSSR (ours) |
|---|---|---|
| 27.9216/0.7504 | 27.5600/0.7135 | 28.6148/0.7809 |

5. CONCLUSION

The concept of "Zero-Shot" SR, was introduced, which exploits the power of Deep Learning, without relying on any external examples or prior training. This is obtained via a small image-specific CNN, which is trained at test time on internal examples extracted solely from the LR test image. This yields SR of real-world images, whose acquisition process is non-ideal, unknown, and changes from image to image (i.e., image-specific settings). In such real-world 'non-ideal' settings, the current method substantially outperforms SotA SR methods, both qualitatively and quantitatively.

6. Applications and Extensions

Additional interesting extensions of the currently provided image-specific SR are:

Unsupervised temporal-SR or space-time-SR of a single video sequence. This can be obtained by down-scaling the video sequence not only in space, but also in time, to generate spatiotemporal LR-HR example pairs.

Combining the currently provided internally-supervised training with externally-supervised training for the cases when external examples are also available and relevant. In fact, one can possibly generate a continuum between a fully-internally supervised to an extensively externally supervised approach, depending on the amount of external examples available.

Blind-SR: While the downscaling kernel was so-far estimated from the test image by the method of [Michaeli et al. 2013], and fed into the image-specific CNN, one may fold the kernel estimation also into the image-specific network. This will allow a full stand-alone Blind-SR setting. One possible way of achieving this task is by using an image-specific autoencoder. This will give rise to an image-specific kernel estimation network.

While the problem of super-resolution of a single image is currently provided, the concept of a signal-specific CNN is more general. It is not restricted only to the problem of SR, nor only to images. It can be generalized to a variety of other signals of various types and dimensions (e.g., video, audio, fMRI, biological data, etc.), and to a variety of other enhancement tasks (e.g., denoising, deblurring, completion of missing data, fixing various image distortions, etc.). In all these examples, the signal-specific network will learn how to perform the desired enhancement task by training on examples extracted or generated directly from the test signal itself.

What is claimed is:

1. A computer implemented method for performing a task on a specific single test signal; the task is at least one selected from: super-resolution, deblurring, denoising, completion of missing data, distortion correction, correcting compression artifacts, dehazing, signal-enhancement, signal-manipulation, and degradation removal; the method comprising:

constructing a signal-specific deep learning neural network (DLNN), by selecting number of nodes, number of layers, and their inter connections, configured for said task and said specific single test signal;

generating training target outputs from said specific single test signal, via transformations thereof;

generating a corresponding training input for each of said training target outputs, by degrading said training target outputs;

training said DLNN to perform said task, using a training set comprising pairs of said training target outputs and their said corresponding training inputs, whereby the DLNN is trained to perform said task only on said specific single test signal and signals originated therefrom; and applying said trained DLNN on said specific single test signal, wherein said specific single test signal is provided as an input to said trained DLNN, to obtain an output signal in accordance with said task.

2. The method of claim 1, wherein said training target outputs are generated from at least one of: different parts of said specific single test signal, different dimensions of said specific single test signal.

3. The method according to claim 1, wherein each of said transformations comprises at least one selected from:

rotating said specific single test signal to at least one angle, around at least one axis;

mirror reflecting said specific single test signal, around at least one axis;

scaling said specific single test signal along at least one axis;

cropping part of said specific single test signal;

applying an intensity transformation on said specific single test signal;

applying a filter on said specific single test signal;

applying a linear transformation on said specific single test signal;

applying a non-linear transformation on said specific single test signal;

applying identity transformation on said specific single test signal; and any combination thereof.

4. The method according to claim 1, wherein at least one of the following holds true:

said specific single test signal is one selected from the group consisting of: image, video sequence, medical signal, MRI, fMRI, audio, an N-dimensional signal;

said method further comprises a step of training said signal-specific DLNN using an external training set; and said method is implemented via at least one device selected from a group consisting of: a computer, a camera, a mobile phone, a screen, a photo editing software, a projector, a computer chip, a hardware platform.

5. The method according to claim 1, further comprising using said trained DLNN to estimate a degradation underlying said specific single test signal.

6. The method according to claim 5, wherein said estimated degradation is at least one of: a blur kernel, a non-uniform blur-field, a super-resolution downscaling kernel, a noise type, a compression type.

7. The method of claim 1, wherein the DLNN is a convolutional neural network (CNN).

8. A computer implemented method for increasing a resolution of a specific single test image, the method comprising:
constructing an image-specific deep learning neural network (DLNN), by selecting number of nodes, number of layers, and their inter connections, configured specifically for increasing the resolution of said specific single test image;
generating training target outputs from said specific single test image, via transformations thereof;
generating a corresponding training input for each of said training target outputs, by downscaling resolution of said training target outputs;
training said DLNN to increase image resolution, using a training set comprising pairs of said training target outputs and their said corresponding training inputs, whereby the DLNN is trained to increase resolution only of said specific single test image and images originated therefrom; and
applying said trained DLNN on said specific single test image, wherein said specific single test image is provided as an input to said trained DLNN, to obtain an output image with increased-resolution thereof.

9. The method according to claim 8, wherein said training target outputs are extracted from at least one of: different parts of said specific single test image, different dimensions of said specific single test image.

10. The method according to claim 8, wherein said generating of said training target outputs is configured to at least partially preserve cross-scale internal recurrence within said specific single test image.

11. The method according to claim 8, wherein each of said transformations comprises at least one selected from:
rotating said specific single test image to at least one angle, around at least one axis;
mirror reflecting said specific single test image, around at least one axis;
scaling said specific single test image along at least one axis;
cropping part of said specific single test image;
applying a color transformation on said specific single test image;
applying an intensity transformation on said specific single test image;
applying a filter on said specific single test image;
applying a linear transformation on said specific single test image;
applying a non-linear transformation on said specific single test image;
applying identity transformation; and
any combination thereof.

12. The method according to claim 8, wherein said downscaling comprising lowering resolution of said training target outputs, using a desired super resolution (SR) scale factor (s).

13. The method according to claim 12 wherein said downscaling is gradual, provided via several intermediate SR scale factors.

14. The method according to claim 8, wherein said training is further provided using crops of at least some of said training target outputs and their corresponding training input crops.

15. The method according to claim 8, wherein at least one of the following holds true:
said method further comprises a step of training said image-specific DLNN using an external training set; and
said method is implemented via at least one device selected from a group consisting of: a computer, a camera, a mobile phone, a screen, a photo editing software, a projector, a computer chip, a hardware platform.

16. The method according to claim 8, further comprising using said trained DLNN to estimate a degradation underlying said specific single test image.

17. The method according to claim 16, wherein said estimated degradation is at least one of: a blur kernel, a non-uniform blur-field, a super-resolution downscaling kernel, a noise type, a compression type.

18. The method of claim 8, wherein the DLNN is a convolutional neural network (CNN).

* * * * *